(12) United States Patent
Adami

(10) Patent No.: US 6,684,749 B2
(45) Date of Patent: Feb. 3, 2004

(54) DEVICE AND METHOD FOR A JOB CHANGE IN A SYSTEM FOR THE LENGTHWISE CUTTING OF A WEBLIKE MATERIAL

(75) Inventor: Mauro Adami, Lucca (IT)

(73) Assignee: Fosber S.p.A., Lucca (IT)

( * ) Notice: Subject to any disclaimer, the term of this patent is extended or adjusted under 35 U.S.C. 154(b) by 191 days.

(21) Appl. No.: 09/866,941

(22) Filed: May 29, 2001

(65) Prior Publication Data

US 2001/0047704 A1 Dec. 6, 2001

(30) Foreign Application Priority Data

May 31, 2000 (IT) .......................... FI00A0123

(51) Int. Cl.$^7$ ................................. B26D 7/06
(52) U.S. Cl. ................. 83/408; 83/425.1; 156/269
(58) Field of Search ..................... 83/408, 508.83, 83/598, 599, 425.4, 425.2, 495, 102, 676; 264/269; 156/269, 210; 493/342, 161

(56) References Cited

U.S. PATENT DOCUMENTS

| | | |
|---|---|---|
| 700,807 A | 5/1902 | Palmer et al. |
| 1,625,862 A | 4/1927 | Martin |
| 1,746,048 A | 2/1930 | Novick |
| 2,369,253 A | 2/1945 | Robinson et al. |
| 2,393,586 A | 1/1946 | Bruker |
| 2,733,766 A | 2/1956 | Wikle |
| 3,410,183 A | 11/1968 | Sarka |
| 3,485,128 A | 12/1969 | Siegenthaler |
| 3,491,632 A | 1/1970 | Dovey |
| 3,522,762 A | 8/1970 | Sauer |
| 3,532,014 A | 10/1970 | Franz |
| 3,691,887 A | 9/1972 | Roch |
| 3,757,645 A | 9/1973 | Roch |
| 3,763,748 A | 10/1973 | Gallagher, Jr. |
| 4,006,656 A | 2/1977 | Shinomiya |
| 4,007,652 A | 2/1977 | Shinomiya et al. |
| 4,159,661 A | 7/1979 | Russell et al. |

(List continued on next page.)

FOREIGN PATENT DOCUMENTS

| | | | |
|---|---|---|---|
| DE | 1949583 | 4/1970 | |
| DE | 1454971 | 9/1970 | |
| DE | 2656242 | 5/1978 | |
| DE | 3248536 | 7/1984 | |
| EP | 0065014 | 11/1982 | |
| EP | 0163595 | 12/1985 | |
| EP | 0458340 | 11/1991 | |
| EP | 0468374 | 1/1992 | |
| EP | 0534177 | 3/1993 | |
| EP | 0607084 | 7/1994 | |
| EP | 0692369 | 1/1996 | |
| EP | 0728560 | 8/1996 | |
| EP | 0737553 | 10/1996 | |
| EP | 0795382 | 9/1997 | |
| EP | 0894533 | 2/1999 | |
| EP | 1031401 | 8/2000 | |
| FR | 2414986 | 8/1979 | |
| FR | 2529817 | 1/1984 | |
| GB | 1014592 | 12/1965 | |
| GB | 2040779 | 9/1980 | |
| GB | 2103139 | 2/1983 | |
| IT | 0 894 583 A2 * | 2/1995 | ........... B26D/11/00 |
| JP | 8192394 | 7/1996 | |

*Primary Examiner*—Alian N. Shoap
*Assistant Examiner*—Ghassem Alie
(74) *Attorney, Agent, or Firm*—Michael Best & Friedrich LLP

(57) ABSTRACT

The device comprises a plurality of lengthwise cutting tools (25; 25B), a transverse trimmer (100) and, downstream of said lengthwise cutting tools, at least two separate paths (PA, PB) for the strips cut from the weblike material. An auxiliary lengthwise cutting tool (51) is provided to generate, on the occasion of a job change, an auxiliary lengthwise cut in a transition zone (J0) to join central cutting lines of two successive jobs. (FIG. 1)

14 Claims, 4 Drawing Sheets

U.S. PATENT DOCUMENTS

| | | | |
|---|---|---|---|
| 4,182,170 A | | 1/1980 | Grupp |
| 4,240,856 A | | 12/1980 | Craemer et al. |
| 4,265,152 A | * | 5/1981 | Corradi ................... 83/106 |
| 4,266,112 A | | 5/1981 | Niedermeyer |
| 4,268,341 A | | 5/1981 | Huhne |
| 4,432,746 A | | 2/1984 | DeHaan |
| 4,437,370 A | * | 3/1984 | Philipp et al. ............ 83/23 |
| 4,476,758 A | * | 10/1984 | Coburn .................... 83/479 |
| 4,548,112 A | | 10/1985 | Thomas |
| 4,630,514 A | | 12/1986 | Ohmori et al. |
| 4,715,254 A | | 12/1987 | DeGan |
| 4,813,319 A | | 3/1989 | Weyand, Jr. |
| 4,846,035 A | | 7/1989 | Granger |
| 4,943,341 A | | 7/1990 | Mattei |
| 4,965,733 A | | 10/1990 | Kimura et al. |
| 4,983,155 A | | 1/1991 | Stobb |
| 4,989,487 A | | 2/1991 | Staley |
| 5,031,496 A | | 7/1991 | Lobash et al. |
| 5,090,281 A | | 2/1992 | Paulson et al. |
| 5,120,297 A | | 6/1992 | Adami |
| 5,152,205 A | | 10/1992 | Yoshida et al. |
| 5,197,366 A | | 3/1993 | Paulson et al. |
| 5,203,246 A | | 4/1993 | Smitterberg et al. |
| 5,297,461 A | * | 3/1994 | Hirakawa et al. .............. 83/304 |
| 5,341,713 A | | 8/1994 | Okamoto et al. |
| 5,351,589 A | | 10/1994 | Creaden |
| 5,393,294 A | * | 2/1995 | Jobst .................... 493/342 |
| 5,406,869 A | | 4/1995 | Prochnow et al. |
| 5,435,217 A | | 7/1995 | Kato et al. |
| 5,483,856 A | | 1/1996 | Smitterberg et al. |
| 5,496,431 A | * | 3/1996 | Hirakawa et al. ........... 156/269 |
| 5,551,328 A | | 9/1996 | Hsu |
| 5,657,677 A | | 8/1997 | Cuir et al. |
| 5,660,095 A | | 8/1997 | Smitterberg et al. |
| 5,761,980 A | | 6/1998 | Ima et al. |
| 5,857,395 A | * | 1/1999 | Bohm et al. .................. 83/408 |
| 5,918,519 A | * | 7/1999 | Schnabel et al. ............. 83/428 |
| 5,951,454 A | * | 9/1999 | Adami ..................... 493/355 |
| 6,026,727 A | | 2/2000 | Meeks |
| 6,103,171 A | * | 8/2000 | Cummings .................. 264/269 |
| 6,117,381 A | * | 9/2000 | Cummings .................. 264/269 |
| 6,165,117 A | | 12/2000 | Adami |

\* cited by examiner

DEVICE AND METHOD FOR A JOB CHANGE IN A SYSTEM FOR THE LENGTHWISE CUTTING OF A WEBLIKE MATERIAL

DESCRIPTION

The present invention relates in general to a device for the lengthwise cutting of a weblike material, such as, for example and in particular, corrugated cardboard, which is subdivided into a plurality of strips having a desired width, from which individual sheets having the desired dimensions are then produced by means of transverse cuts.

In cutting and creasing plants for the production of sheets of corrugated cardboard intended, for example, for the manufacture of boxes, it frequently becomes necessary to change the job being processed. The job change normally requires a change in the positions of the lengthwise cutting lines and/or of the lengthwise creasing lines. This occurs because different jobs performed in succession by the same plant are characterized by different dimensions of the final sheets produced.

During the job change phase, certain problems arise that are well known to those skilled in the art, in particular when the plant is of the type having two or more levels, in other words of the type in which the strips cut lengthwise from a single weblike material are conveyed to transverse cutting devices disposed at different heights. In this case, one of the lengthwise cutting lines subdivides the weblike material into one or more strips that are conveyed to a first level and one or more strips that are conveyed to a different level to be subdivided into sheets. On the occasion of a job change, the intermediate cutting line that subdivides the strips being conveyed to the two levels is normally shifted in position, so that it becomes necessary to connect the two intermediate cutting lines in order to avoid the tearing of the weblike material.

The problems associated with plants of this type, in particular in relation to job changes, and the respective solutions proposed are described in detail in EP-B-0 737 553 and in the patents cited therein, to which reference is made for a more thorough analysis. A different solution to the abovementioned problem is described in EP-A-0 894 583.

It is the object of the present invention to propose a method and a device that make it possible to overcome the problems of job changes in multilevel cutting and creasing plants.

Substantially, according to the invention, a device is provided comprising a plurality of lengthwise cutting tools and one transverse cutting tool, wherein the lengthwise cutting tools are controlled in a manner such as to generate a first series of lengthwise cutting lines in a first working job and a second series of lengthwise cutting lines in a second working job, a transition zone from the first to the second job being generated between the two working jobs wherein said transverse cutting tool generates a transverse connecting cut. According to the invention, the device is characterized in that it comprises at least one auxiliary lengthwise cutting tool which, in said transition zone, generates an auxiliary lengthwise cut which is joined, via the transverse cut, to one of the lengthwise cutting lines generated by said lengthwise cutting tools, or to a second auxiliary lengthwise cut generated by a second auxiliary lengthwise cutting tool.

The transverse connecting cut may be orthogonal to the direction of advance of the weblike material, but this is not absolutely necessary. The term transverse cut is to be generally understood as meaning, in the present context, a cut that is not parallel to the direction of advance of the weblike material.

According to a practical embodiment of the invention, the auxiliary lengthwise cutting tool is controlled in a manner such as to generate within the transition zone between the two jobs the auxiliary lengthwise cut aligned with and joined to one of the lengthwise cutting lines of the first job. The lengthwise cutting tools are controlled in a manner such that one of the lengthwise cutting tools intended to cut the weblike material lengthwise in the second job is brought into a working position in advance, relative to the remaining tools, to generate a lengthwise cutting line which is joined by the transverse cut to said auxiliary lengthwise cut in the transition zone between the two successive jobs.

By means of the device according to the present invention it is possible to implement a method for cutting an indefinite weblike material lengthwise into a plurality of lengthwise strips, comprising the phases of:

subdividing said weblike material into a plurality of strips as required by a first working job by lengthwise cutting lines generated by lengthwise cutting tools;

on completion of the processing of said first job, changing the position of the cutting tools and commencing the processing of a second job with a different positioning of lengthwise cutting lines, generating a transition zone between the end of the first job and the start of the second job;

connecting two lengthwise cutting lines of the first and second jobs in said transition zone between the first and the second job by means of a transverse cut;

generating in said transition zone between the two successive jobs, by means of an auxiliary lengthwise cutting tool, an auxiliary lengthwise cuffing line that prolongs one of the lengthwise cutting lines;

extending the action of one of said lengthwise cuffing tools in order to extend the corresponding lengthwise cutting line into said transition zone between the two successive jobs;

the extended lengthwise cutting line and the auxiliary lengthwise cutting line being joined to one another by said transverse cut.

The various cuts may be made in different sequences along the path of advance of the weblike material. For example, the auxiliary lengthwise cut and the transverse cut may be performed even before the weblike material is cut into strips, in other words upstream of the lengthwise cutting tools, provided that the cut is in the correct position to be able to join up in the desired manner with the lengthwise cuts generated by the cutting tools.

Further advantageous features of the method and of the device according to the invention are indicated in the appended claims.

The invention will be better understood by reading the description that follows with reference to the appended drawings, which show a practical, nonlimiting embodiment of the invention. In the drawings:

BRIEF DESCRIPTION OF THE DRAWINGS

In FIG. 1, a general view is shown of the structure of a device for cutting and creasing a weblike material N coming, for example, from a corrugated cardboard production line. The device has a first creasing station 1, a second creasing station 3, a first cutting station 5 and a second cutting station 7. The four stations (forming what is known as a slitter-scorer) may be disposed in various ways, and in the example shown the two creasing stations are positioned upstream of the cutting stations, but this is not obligatory. It is also possible to provide arrangements in which the creasing and cutting stations are disposed alternately, or with the cutting stations upstream of the creasing stations. As will be clear from the description that follows, moreover, it is also possible to provide a single cutting station and/or a single creasing station.

The invention is described with reference to a complex device also equipped with creasing tools, but it is understood that the invention may also be applied to different machines or devices, for example those lacking creasing tools. Furthermore, the configuration of the cutting and creasing stations is not critical, the method of the present invention being capable of being used on any type of slitter-scorer able to produce a weblike material cut lengthwise into portions intended to be passed to two or more levels for the subsequent transverse cut.

Figure 1:
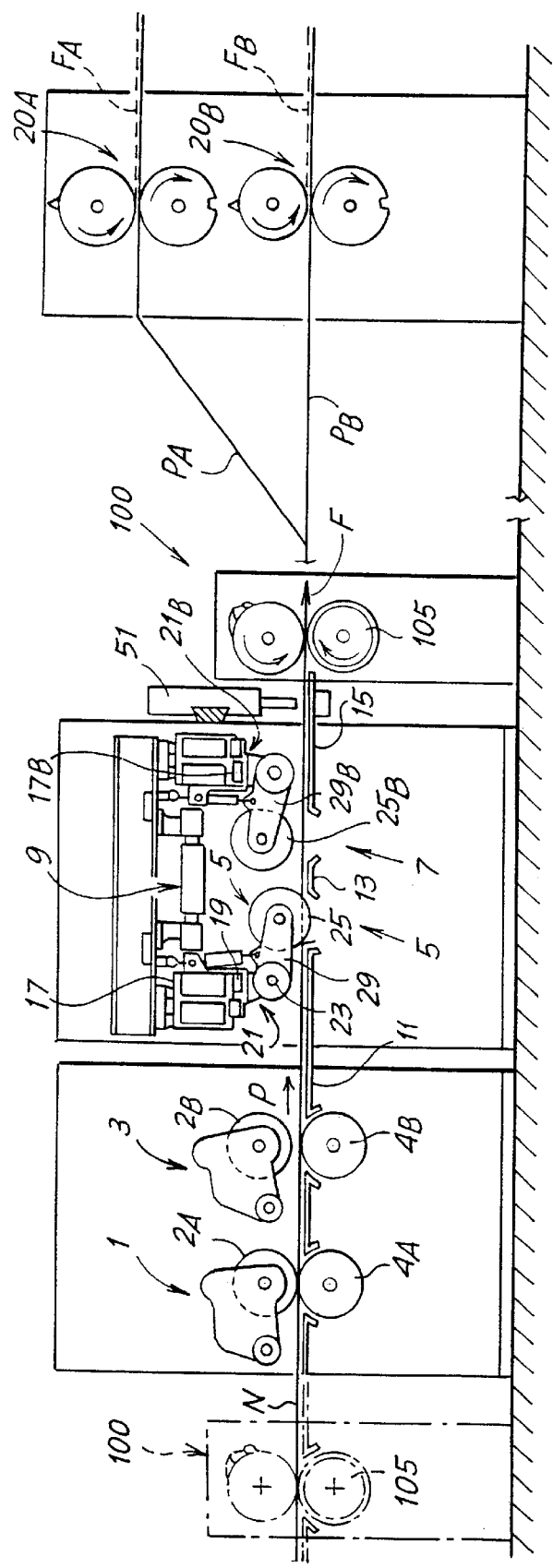
FIG. 1 shows a diagram—in a lateral view—of a plant for cutting and creasing a web of corrugated cardboard according to the invention.

In the situation shown in FIG. 1, the creasing tools of the station 1, designated 2A, 4A, are in operation while those of the station 3, designated 2B, 4B, are disengaged from the weblike material N and can be positioned by a suitable positioning robot (not shown). The cutting tools 25B of the station 7 are idle and may be positioned by the positioning robot generally designated 9, while the tools 25 of the station 5 are in operation.

The two cutting stations 5 and 7 are substantially of mirror-image design and the elements that form them are therefore substantially the same.

The lengthwise path of the weblike material N is designated P and at the cutting stations 5, 7 said material slides on sliding surfaces 11, 13, 15.

The cutting station 5 possesses, in the nonlimiting embodiment shown by way of example, a crosspiece 17 bearing below it a guide 19 which extends transversely to the direction F of advance of the weblike material. A plurality of cutting assemblies 21, one of which can be seen in the lateral view of FIG. 1, slide along the guide 19.

Through the various cutting assemblies 21 passes a drive shaft 23 which supplies the power to the various cutting tools 25 of the cutting assembly 21. Each cutting tool 25 is keyed on a mandrel supported at the end of an arm 29 oscillating about the axis of the drive shaft 23. The tool rotates counterclockwise, in the example, and has a peripheral velocity typically equal to 3 or 4 times the speed of advance of the weblike material N. The speed of rotation of the cutting tools 25 may also be significantly different from that indicated above and may be equal to or only slightly greater than the speed of advance of the weblike material. This occurs when, for example, the cutting tools each comprise a pair of disk-shaped blades interacting with a shearing or scissoring effect.

The cutting station 7 is arranged as a mirror image of the station 5, and identical numbers followed by the letter B indicate identical or corresponding components.

In a manner known per se (for example, from one of the publications cited in the introductory section), the cutting and creasing tools of the stations 1, 3, 5, 7 generate parallel cutting and creasing lines on the weblike material N, disposed in accordance with a particular distribution along the transverse direction of the weblike material. One of the cutting lines generated by one of the tools 25 subdivides the weblike material N into two portions that are passed along two paths PA and PB, along which are located respective transverse cutters 20A, 20B disposed at two different levels, for cutting the lengthwise strips into sheets FA and FB, shown by way of indication downstream of the cutters 20A, 20B.

When the processing of a job has been completed, the cutting tools and the creasing tools 2A, 4A in operation are lifted and disengaged from the weblike material, while the cutting tools 25B and the creasing tools 2B, 4B enter into operation. These have previously been disposed in a position normally different from that of the tools previously in operation and corresponding to the specifications of the new job.

The device further possesses a shear 100 which can be disposed upstream or downstream of the cutting and creasing stations 1, 3, 5, 7, as shown in FIG. 1, where the alternative position upstream of the cutting and creasing is indicated in broken lines. This serves to perform a transverse joining cut between the intermediate lengthwise cutting lines that divide, in two successive jobs, the two portions of weblike material intended to be passed to the two levels along the paths PA and PB.

The shear 100 may be produced as described in EP-A-0 894 583, or as described in the copending European patent application No. 99 830 098. In general, the shear 100 has a configuration such as to be able to perform a transverse cut of a desired length and in the requisite position along the transverse extent of the weblike material N, for the purposes that will become apparent below.

The plant is completed by an auxiliary lengthwise cutting tool, designated 51, which in the example shown is produced in the form of a water jet. This tool may however be any cutting tool, including for example a laser device, a rotating blade with or without a counterblade, or the like. In fact, as will become apparent from the description that follows, contrary to other known solutions (in particular that described in EP-A-0 737 553) the auxiliary tool 51 is required to perform not an inclined cut in the weblike material N but a lengthwise cut.

During the processing of a job, the auxiliary lengthwise cutting tool 51 is non-operative and the weblike material N is cut and creased by the creasing and cutting tools of one of the two stations 1, 3 and 5, 7 respectively. In a manner known per se, one of the cutting tools currently in operation generates a cutting line that subdivides the weblike material into two portions that follow the two paths PA and PB and are passed to the two transverse cutters 20A, 20B.

On the occasion of a job change, a transition zone is generated between two successive jobs and the intermediate cutting line normally changes position. In the transition zone between the two jobs the connection is made between the old and the new intermediate cutting lines. For this purpose, the device briefly described operates as follows.

Before the job change the auxiliary lengthwise cutting tool 51 is brought into alignment with the lengthwise cutting tool that is currently generating the intermediate cutting line, which subdivides the weblike material into the two portions intended for the two paths PA and PB and directed to the two levels. When the job change is to take place, the cutting tools currently in operation, for example the tools of the station 5, are all simultaneously lifted and taken out of operation. The auxiliary lengthwise cutting tool 51 is brought into operation in a synchronized manner and, having been aligned with the lengthwise cutting tool that has hitherto been generating the intermediate cutting line, prolongs that cutting line by an appropriate distance.

Of the cutting tools of the second station 7, the tool that is to generate the new intermediate cutting line is brought into operation first. This line is thus advanced, relative to the remaining lengthwise cutting lines, by an amount sufficient to bring the start of this second intermediate cutting line (of the new job) approximately into the same zone in which the cutting line generated by the auxiliary lengthwise cutting tool 51 ends. The two ends of the cutting lines are joined by a transverse cut generated by the shear 100. The transverse position and the length of this joining transverse cut depend on the position assumed by the two intermediate cutting lines in the two jobs. For this reason, the shear 100 is able to generate cuts in positions and of lengths appropriately selected on the basis of the working conditions arising at a given time.

Figure 2:
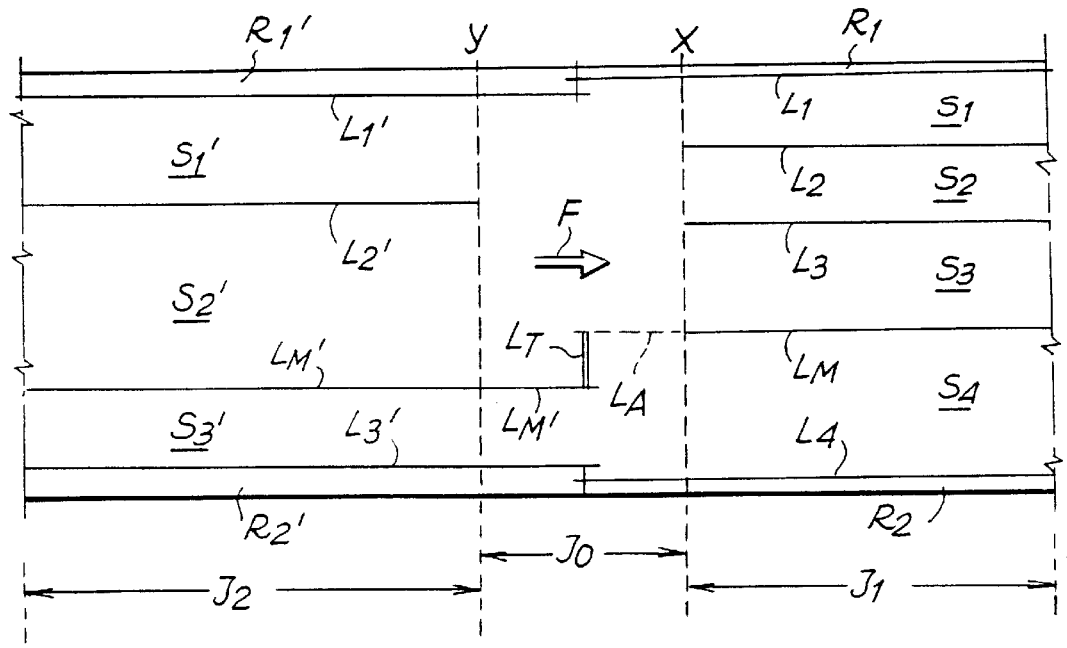
FIG. 2 shows a diagrammatic view of an embodiment of the transition zone between two successive jobs in the weblike material.

The cuts in the transition zone between two successive jobs are diagrammatically illustrated in FIG. 2. Here, J1 designates the end part of the old working job, J2 the initial part of the new job and J0 the transition zone, in other words the zone of changeover, between the first job J1 and the second job J2. For simplicity, only the cutting lines are shown, while the creasing lines are omitted. In the end zone of the old job the lengthwise cutting lines L1, L2, L3, L4 and LM are visible. The cutting lines L1 and L4 generate the lateral trims R1 and R2, while the line LM is the line that subdivides the strips S1, S2, S3, intended to be passed along the path PA to the transverse cutter 20A, from the line S4, intended to be passed along the path PB to the transverse cutter 20B.

In the initial portion J2 of the new job the cutting lines L1', L', L3' and LM' are visible, these generating the strips S1', S2', S3'. The line LM', moreover, separates the strips S1', S2', intended for the path PA, from the strip S3', intended for the path PB.

Two transverse lines designated X and Y indicate the zone where the cutting lines L1, L2, L3, L4, LM end and where the cutting lines L1', L2', L3' begin, respectively. The transverse lines X and Y substantially delimit the transition zone.

The intermediate cutting line LM is prolonged by an auxiliary lengthwise cut LA, shown in broken lines for greater clarity, which is generated by the auxiliary lengthwise cutting tool 51. The intermediate lengthwise cutting line LM' of the new job begins first and is then prolonged into the transition zone J0 between the first and second jobs, as shown in FIG. 2. The initial end of this cutting line LM' is joined to the concluding end of the auxiliary lengthwise cut LA by a transverse cut LT generated by the shear 100. This cut may be orthogonal to the direction of advance (arrow F) or slightly inclined, for example if the shear 100 is using a helical blade.

The shear 100 can also generate cuts severing the trims R1, R1'; R2, R2', as shown in FIG. 2. The trims may however also be continuous, or be delimited by transverse edge cuts in the zones X and Y. In the case shown, the lengthwise cutting tools that generate the trims (cutting lines L1, L4; L1', L3') are brought into operation and taken out of operation later than and before, respectively, the remaining lengthwise cutting tools. This, however, is not indispensable for the purposes of the present invention which, conversely, relates to the methods of joining the intermediate cutting lines LM, LM' without reference to how the trims are produced. In an alternative embodiment, the trims may be generated by cutting tools still in operation, which are displaced transversely—without moving out of the weblike material—on the occasion of a job change.

Overall, as can be seen in FIG. 2, substantial continuity is obtained in the transition zone between two successive jobs as between the intermediate lengthwise cutting line LM of the old job and the intermediate lengthwise cutting line LM' of the new job. The continuity is provided by the presence of the auxiliary cut LA, by the transverse cut LT and by the advancing of the point in time at which the cutting tool which, in the new job, generates the line LM' enters into operation, in other words by the downstream elongation of this lengthwise cutting line.

The method of joining the intermediate lengthwise cutting lines can be implemented irrespective of the position in which the auxiliary lengthwise cutting tool 51 is disposed, and also of where the shear 100 which performs the transverse cut LT is disposed.

Indeed, as can be seen in the diagram according to FIG. 1, the shear 100 may assume a position upstream of the creasing tools 1, 3. The same can be said of the auxiliary lengthwise cuffing tool 51. This could be placed upstream of the creasing stations 1, 3, and even upstream of the shear 100, in turn positioned upstream of the creasing stations 1, 3.

In fact, the only thing that changes is the point in time at which these cutting means are activated in order for the various cutting lines, at the exit from the machine, to be in the correct position, shown in FIG. 2. When the shear 100 and the auxiliary lengthwise cutting tool 51 are located upstream of the cutting stations 5, 7, these generate the cuts LT and LA in a portion of the weblike material not yet subdivided into strips, in the appropriate position to obtain, at the exit from the cutting stations, the overall arrangement of the cutting lines shown in FIG. 2.

The method described may be implemented even when all the cutting tools 25, 25B, which in the example shown are disposed in two stations 5 and 7, are grouped in a single station. In this case, a single positioning system for the tools acts to position the tools during the brief moment in which the job change takes place, at least as regards those cutting tools that operate in the execution of both the old job and the new job. If the device provides a certain number of tools that are at rest during the processing of the old job and enter into operation only in the processing of the new job, for example because the latter provides for a larger number of lengthwise cutting lines, the positioning of these tools may be undertaken before the job change, with a reduction of the time necessary for said positioning.

Figure 3:
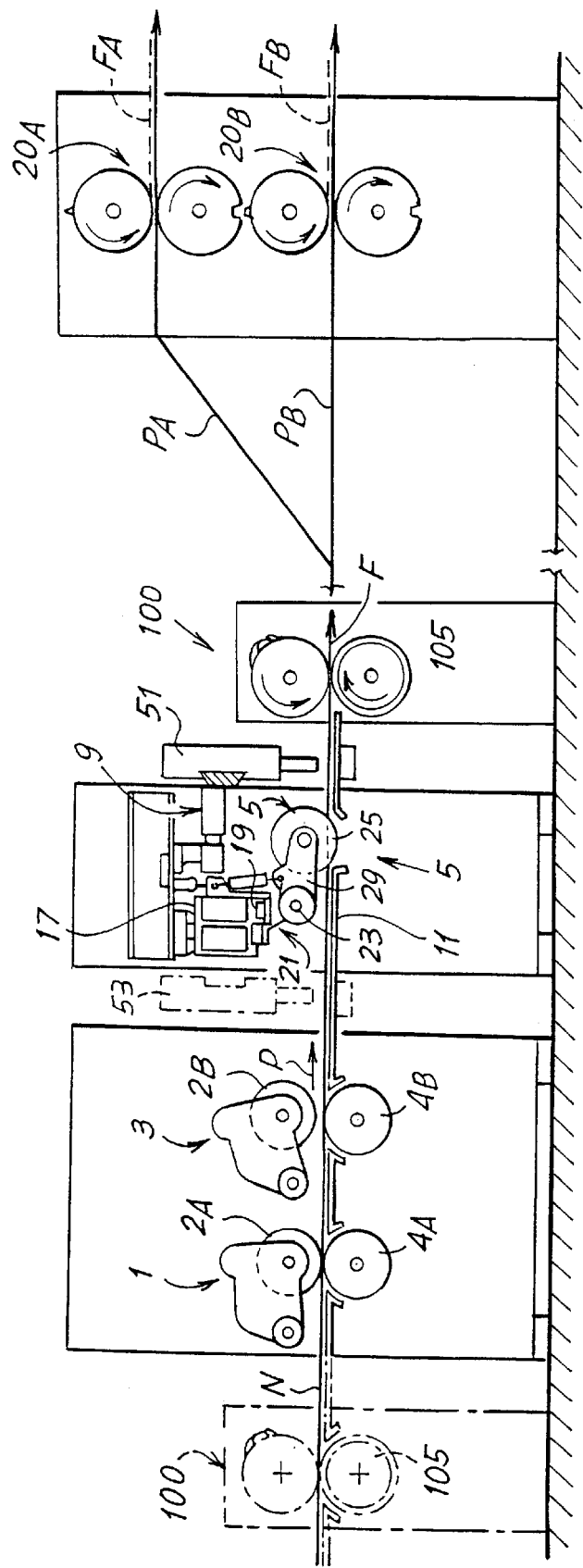
FIG. 3 shows a diagrammatic lateral view of a simplified plant.

FIG. 3 shows a diagrammatic longitudinal view of the plant in this second hypothesis, where identical numbers indicate components identical or equivalent to those of the plant according to FIG. 1, while the arrangement of the cutting lines in the transition zone between two successive jobs is equivalent to that shown in FIG. 2. In this second hypothesis also, the cutting tools are subdivided into a first and a second series of cutting tools which operate on the first and second jobs, respectively, with the difference that the two series of tools are disposed in the same cutting station and may possess tools in common. In the extreme case, the two series of cutting tools have all the tools in common, that is to say that the tools of one series correspond to the tools of the second series, except as regards the transverse position assumed during operation, which changes between the first and second jobs. This happens when the two jobs processed in succession require the use of the same tools in different positions. In this case all the tools are repositioned by the positioning devices during the job change phase. To facilitate this operation, it is possible to prolong the auxiliary cut LA, extending the time available for the repositioning of the tools.

Figure 4:
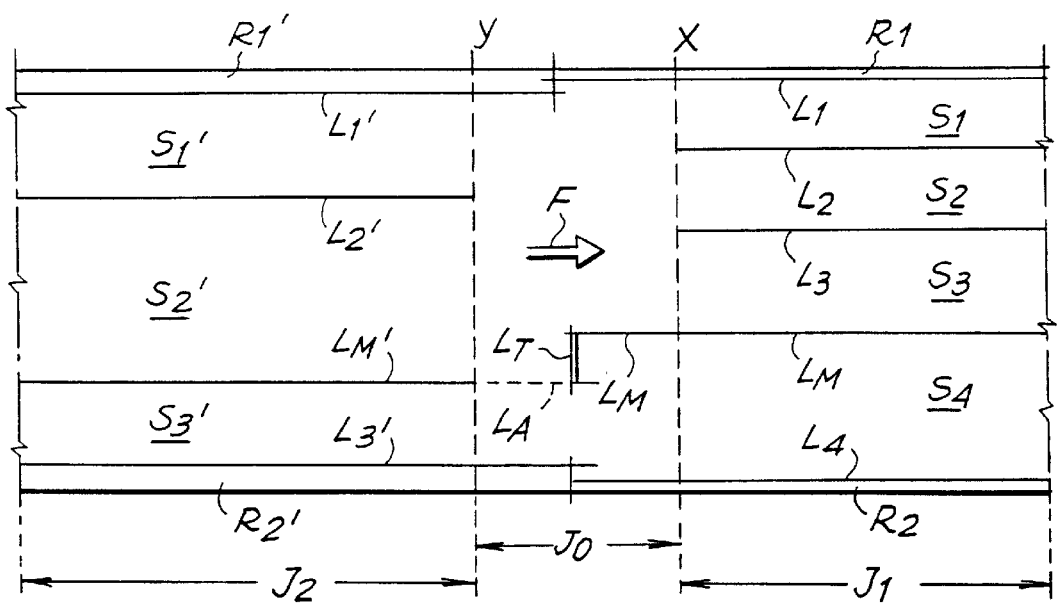
FIG. 4 shows a diagrammatic view of a second embodiment of the transition zone between two successive jobs in the weblike material.

The method may also be implemented with inversion of the position of the auxiliary lengthwise cut LA relative to the intermediate cutting line prolonged into the transition zone J0 between the jobs J1 and J2. This situation is shown diagrammatically in FIG. 4. The intermediate lengthwise cutting line LM of the first job J1 has been prolonged into the transition zone J0, while the intermediate lengthwise cutting line LM' of the second job J2 begins together with the other lengthwise cutting lines L1', L2', L3', and is joined to the auxiliary lengthwise cut LA. The latter is joined to the prolongation of the intermediate cutting line LM of the first job J1.

According to a further embodiment of the invention, the device provides two auxiliary lengthwise cutting tools, which each perform an auxiliary lengthwise cut extending into the transition zone between two successive jobs, to prolong the two intermediate lengthwise cutting lines of the two sequential jobs separated by the transition zone J0. FIG. 3 shows diagrammatically the presence of a second auxiliary tool, shown in broken lines at 53. The position of the two auxiliary tools 51, 53 along the path of the weblike material N may also be different from that shown by way of example.

Figure 5:
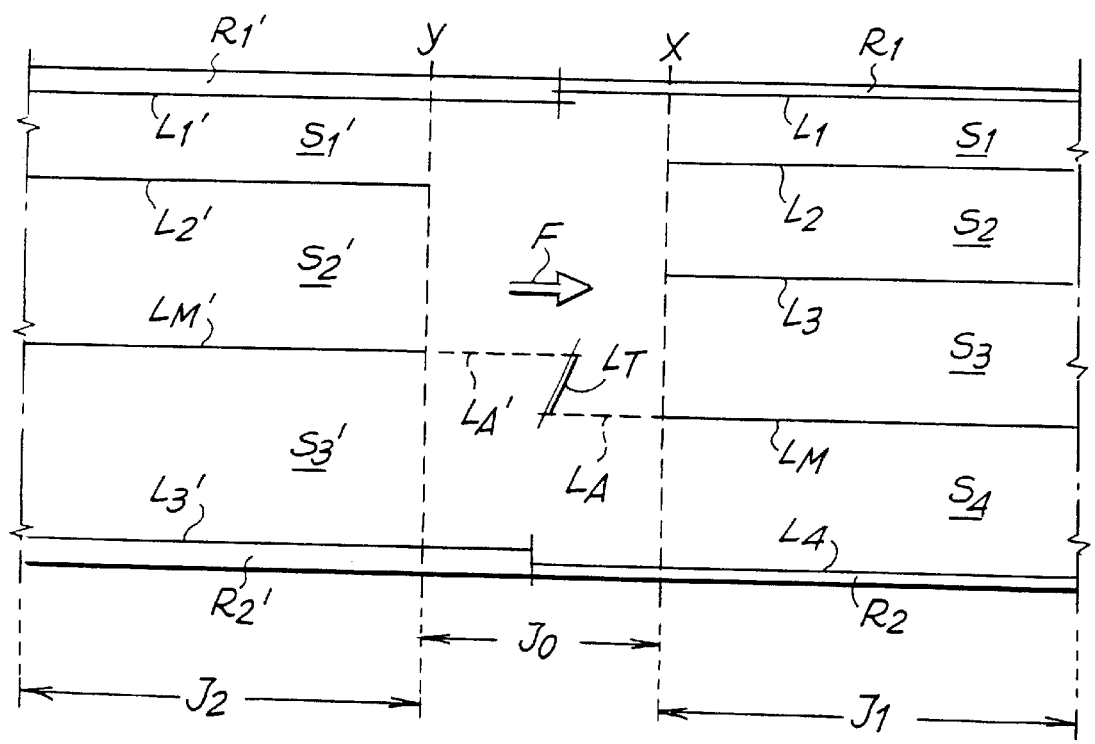
FIG. 5 shows a diagrammatic view of a third embodiment of the transition zone between two successive jobs in the weblike material.

In this case, the lengthwise cutting tools 25, 25B (or the tools 25 alone, in the case of FIG. 3) are all simultaneously brought into operation and taken out of operation, interrupting the cutting lines of the first job J1 at the line X and beginning the lengthwise cutting lines of the new job J2 at the line Y. The situation is shown in FIG. 5: in an appropriate position along the path of the weblike material N, one of the two auxiliary lengthwise cutting tools performs the auxiliary lengthwise cut LA and the other the lengthwise cut LA', respectively prolonging the intermediate line LM of the old job and the intermediate line LM' of the new job. The cuts LA and LA' extend into the transition zone J0 as far as the point at which they can be joined by the transverse cut LT. By way of example, in this case the transverse connecting cut LT has been shown inclined relative to the direction of advance of the weblike material.

It is understood that the drawing shows only one practical, nonlimiting embodiment of the invention, which may be varied in terms of shapes and arrangements without thereby departing from the scope of the underlying concept of the invention. The presence of any reference numerals in the appended claims serves to facilitate reading thereof in the light of the description and of the drawings but does not limit their scope of protection.

What I claim is:

1. A device for cutting a weblike material lengthwise into a plurality of strips as required by successive jobs, said device comprising a plurality of lengthwise cutting tools, a transverse cutting tool and, downstream of said lengthwise cutting tools, at least two separate paths for the strips cut; and wherein the lengthwise cutting tools are controlled in a manner such as to generate a first series of lengthwise cutting lines in a first working job and a second series of lengthwise cutting lines in a second working job, a transition zone between the two working jobs being generated between said first and said second jobs, in which said transverse cutting tool generates a transverse cut; said device further comprising at least one auxiliary lengthwise cutting tool which, on the occasion of a job change, generates at least one auxiliary lengthwise cut in said transition zone, said auxiliary lengthwise cut prolonging at least one of the lengthwise cutting lines as far as the transverse cut.

2. The device as claimed in claim 1, wherein the transverse cutting tool, the auxiliary lengthwise cutting tool and the lengthwise cutting tools are controlled in a manner such that the transverse cut generated in the transition zone between the first and second jobs connects the auxiliary lengthwise cut to one of the lengthwise cutting lines generated by said lengthwise cutting tools, which is prolonged into said transition zone.

3. The device as claimed in claim 2, wherein said auxiliary lengthwise cutting tool is controlled in a manner such as to generate, within the transition zones, the auxiliary lengthwise cut aligned with and joined to one of the lengthwise cutting lines of the first job, and wherein said lengthwise cutting tools are controlled in a manner such that one of the lengthwise cutting tools intended to cut the weblike material lengthwise in the second job is brought into a working position in advance of the remaining tools, to generate a lengthwise cutting line which is joined by the transverse cut to said auxiliary lengthwise cut.

4. The device as claimed in claim 1, wherein said lengthwise cutting tools are subdivided into two tool stations disposed in sequence along the path of advance of the weblike material and wherein the first job and the second job are processed by tools of one station and of the other station, respectively, wherein the first job is the current job and the second job is the subsequent job, and wherein the tools of the other station are the currently inactive tools, the currently inactive tools being positioned by positioning means for the processing of the subsequent job.

5. The device as claimed in claim 1, wherein the device includes a first set of lengthwise cutting tools and a second set of lengthwise cutting tools, and wherein positioning means position the second set of lengthwise cutting tools for the processing of the second job after the first set of lengthwise cutting tools that perform the first job have been taken out of operation.

6. The device as claimed in claim 1, including two auxiliary lengthwise cutting tools which generate two auxiliary lengthwise cuts in said transition zone, to prolong a lengthwise cutting line of the first job and a lengthwise cutting line of the second job into said transition zone.

7. A method for cutting an indefinite weblike material lengthwise into a plurality of lengthwise strips, comprising the phases of: subdividing said weblike material into a plurality of strips as required by a first job by lengthwise cutting lines generated by lengthwise cutting tools; on completion of the processing of said first job, commencing the processing of a second job with a different positioning of lengthwise cutting lines, generating a transition zone between the end of the first job and the start of the second job; generating in said transition zone a transverse cutting line and connecting two lengthwise cutting lines of the first and second jobs; and wherein at least one auxiliary lengthwise cutting line is generated in said transition zone by means of at least one auxiliary lengthwise cutting tool and prolongs at least one of the lengthwise cutting lines as far as said transverse cut.

8. The method as claimed in claim 7, wherein the action of one of said lengthwise cutting tools is extended in order to extend the corresponding lengthwise cutting line into said transition zone; and the lengthwise line is connected by means of said transverse cut to said auxiliary lengthwise cutting line.

9. The method as claimed in claim 8, wherein said auxiliary cutting tool prolongs one of the lengthwise cutting lines of the first job and wherein one of the lengthwise cutting lines of the second job is prolonged into the transition zone, by advancing the action of the appropriate lengthwise cutting tool relative to the action of the remaining lengthwise cutting tools operating during the processing of said second job.

10. The method as claimed in claim 7, wherein two auxiliary lengthwise cuts are generated, by means of two auxiliary lengthwise cutting tools, and prolong into the transition zone two respective lengthwise cutting lines of the first and second jobs, and said two auxiliary lengthwise cuts are joined by means of said transverse cut.

11. The device as claimed in claim 2, wherein said lengthwise cutting tools are subdivided into two tool stations disposed in sequence along the path of advance of the weblike material and wherein the first job and the second job are processed by tools of one station and of the other station, respectively, the currently inactive tools of the station being positioned by positioning means for the processing of the subsequent job.

12. The device as claimed in claim 2, wherein the lengthwise cutting tools are disposed in a single cutting station and wherein positioning means position the tools for the processing of the second job after the tools that perform the first job have been taken out of operation.

13. The device as claimed in claim 3, including two auxiliary lengthwise cutting tools which generate two auxiliary lengthwise cuts in said transition zone, to prolong a lengthwise cutting line of the first job and a lengthwise cutting line of the second job into said transition zone.

14. The method as claimed in claim 7, wherein said auxiliary cutting tool prolongs one of the lengthwise cutting lines of the first job and wherein one of the lengthwise cutting lines of the second job is prolonged into the transition zone, by advancing the action of the appropriate lengthwise cutting tool relative to the action of the remaining lengthwise cutting tools operating during the processing of said second job.

* * * * *